G. C. NICHOLS.
Mode of Constructing Cement Water and Gas-Pipes.
No. 137,562. Patented April 8, 1873.
FIG. 1
FIG. 2
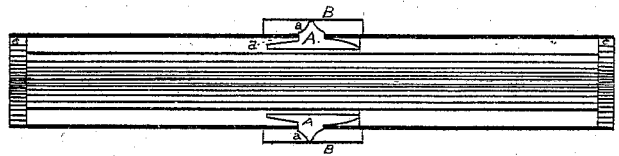
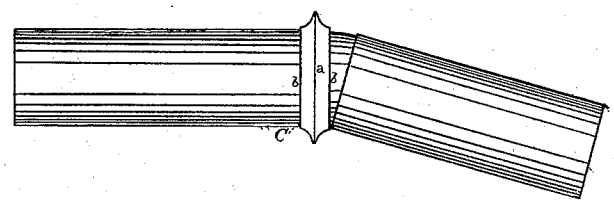
FIG. 3
FIG. 4
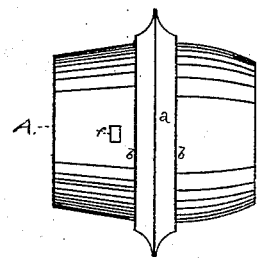
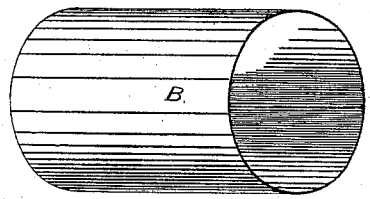
WITNESSES
INVENTOR

UNITED STATES PATENT OFFICE.

G. CLARKE NICHOLS, OF BINGHAMTON, NEW YORK.

IMPROVEMENT IN THE MODES OF CONNECTING CEMENT WATER AND GAS PIPES.

Specification forming part of Letters Patent No. 137,562, dated April 8, 1873; application filed November 11, 1872.

*To all whom it may concern:*

Be it known that I, G. CLARKE NICHOLS, of Binghamton, in the county of Broome and State of New York, have invented certain Improvements in the Mode of Connecting Wrought-Iron Cement Water and Gas Pipes, of which the following is a specification:

My invention relates to the construction and application of a metallic thimble or socket for connecting the ends of the pipes in such a manner that said socket shall render the required rigidity to the end of the pipe and connecting-sleeve, and also facilitate the operation of laying and adjusting the pipe on curves, thereby obviating the usual fitting, trimming, and mending required by the ordinary method.

Figure 1 in the accompanying drawing is a longitudinal transverse section of a connection embodying my invention. Fig. 2 represents the connection when laid on a curve or change of direction from a straight line. Fig. 3 is the socket detached. Fig. 4 is the sleeve.

A is the socket or thimble, which has a projecting bead, $a$, made to fit into the sleeve B. The base of this bead forms the shoulders $b\ b$ on the socket, one end of which has a plane taper from the shoulder $b$ to the end, which is entered into the end of the pipe C as far as the shoulder, and secured by punching an indentation into a corresponding notch, $f$, in the socket. The other end has a spherical surface from the shoulder $b$, so that the radius of the surface shall be the exact inside diameter of the pipe, thereby allowing of a change of direction from a straight line without injury to the joint, as shown by Fig. 2. The interior coating of cement is applied after the tapered end of the socket has been secured in the end of the pipe, as before described. The pipe is then placed in a vertical position, and the coating introduced from the upper end, which forces the material into the space $d$ around the tapered end of the socket. An uncoated space is left at the end of the pipe for the reception of the spherical end of the socket of the subsequent piece.

When the first joint has been laid in a suitable bed of cement mortar the space $d$ is filled with pure fresh cement. The sleeve B is then slipped over the bead $a$, and the spherical end of the socket in the next pipe is entered until it reaches the shoulder of the coating. The sleeve is then filled on both sides of the bead, thereby making a permanent water-tight joint.

By this arrangement the pipe and sleeve may be made of much lighter material than by the ordinary method, as the application of the socket renders them a safe and rigid support.

I claim as my invention—

The coupling A, having the recess $f$ and rounded ends so as to allow the pipes to be turned at angles, in combination with the sleeve B, the parts being lined with cement so as to prevent the contact of the water with the metal of the pipes, substantially as shown and described.

G. CLARKE NICHOLS.

Witnesses:
 J. C. ROBIE,
 H. C. MERRICK.